United States Patent [19]
Langer et al.

[11] 4,385,135
[45] May 24, 1983

[54] INTUMESCENT SHEET MATERIAL CONTAINING LOW DENSITY FILLERS

[75] Inventors: Roger L. Langer, Hudson, Wis.; Alan J. Marlor, Minneapolis, Minn.

[73] Assignee: Minnesota Mining and Manufacturing Company, Saint Paul, Minn.

[21] Appl. No.: 382,156

[22] Filed: May 26, 1982

[51] Int. Cl.³ ............................................... C08K 3/34
[52] U.S. Cl. .................................... 523/179; 523/138; 523/218; 523/219; 524/450; 428/220; 106/122; 106/286.5
[58] Field of Search ............... 523/138, 179, 218, 219; 524/450; 106/122, 286.5; 428/220

[56] References Cited
U.S. PATENT DOCUMENTS
2,884,380  4/1959  Cook et al. .......................... 523/218

FOREIGN PATENT DOCUMENTS
23420  2/1979  France ................................. 524/450
51-80323  7/1976  Japan ................................. 523/218

Primary Examiner—Lewis T. Jacobs
Attorney, Agent, or Firm—Cruzan Alexander; Donald M. Sell; Edward T. Okubo

[57] ABSTRACT

Flexible intumescent sheet materials containing low density filler components to provide low density mounting mats which reduce the mount density to prevent ceramic diesel particulate monolith cracking are disclosed.

5 Claims, No Drawings

INTUMESCENT SHEET MATERIAL CONTAINING LOW DENSITY FILLERS

DESCRIPTION

1. Technical Field

The present invention relates to flexible intumescent sheet materials containing low density filler components resulting in sheet materials of significantly lower density than conventionally available sheets. The low density sheet materials of the invention are particularly useful as a packing material for mounting and positioning automobile catalytic converter monoliths within containers and find particular utility in mounting fragile ceramic monoliths of diesel particulate filters.

2. Background Art

It has become recognized that catalytic devices are needed for (1) oxidation of carbon monoxide and hydrocarbons and (2) reduction of the oxides of nitrogen in automobile exhaust gases in order to control pollution. Due to the relatively high temperatures encountered in these catalytic processes, ceramic has been the natural choice for catalyst supports. Particularly useful supports are provided by ceramic honeycomb structures as described, for example, in U.S. Pat. No. RE 27,747.

Ceramic bodies tend to be frangible and to have coefficients of thermal expansion differing markedly from those of metal containers. Thus, the mounting of the ceramic body in the container must provide resistance to mechanical shock due to impact and vibration and to thermal shock due to thermal cycling. Both thermal and mechanical shock may cause deterioration of the ceramic support which, once started, quickly accelerates and ultimately renders the device useless. Materials that have been found useful as a packing material for these purposes are disclosed in U.S. Pat. Nos. 3,916,057, 4,305,992, and U.K. Pat. No. 1,513,808.

It has been found that the above intumescent sheet materials can exert tremendous pressures on the ceramic monoliths of catalytic converters. These pressures, combined with the shear modulus, the coefficient of friction and the coefficient of thermal expansion of the intumescent sheet material may cause cracks within the ceramic monolith. These cracks are termed "ring off" cracks and occur perpendicularly to the gas flow usually near the center of the monolith. In severe cases, the ceramic monolith is completely severed into two pieces.

DISCLOSURE OF INVENTION

With presently available materials, a minimum mount or packing density of 0.6 gm/cc of intumescent sheet materials is required to hold the ceramic monolith in place during the normal operating conditions of the catalytic converter. However, due to the dimensional tolerances of the ceramic monolith, the metal housing and the thickness tolerances of the intumescent sheet materials, mounting densities can frequently be 2 to 2.5 times the minimum mount density, i.e., 1.2-1.5 gm/cc. Under these high mounting density conditions and at increased operating temperatures, ring off cracking of the ceramic monolith usually occurs. If the ceramic monolith is inherently weak, as in the case of the diesel particulate filters, ring off cracks will occur at mounting densities even lower than used to mount the stronger conventional ceramic substrates. Ring-off cracking in a diesel particulate filter monolith renders it useless. It is clear that intumescent sheet materials in their presently available forms exert too much force on fragile diesel particulate filter ceramic bodies. However, if the mount density of the intumescent sheet is reduced to avoid ring off cracking, the support of the ceramic monolith will then be inadequate and results in catastrophic damage from the effects of vibration, etc.

It has unexpectedly been found that by incorporating low density inorganic filler components into the intumescent sheet, the forces exerted on the ceramic monolith are moderated and detrimental ring off cracks of the monolith can be prevented while at the same time exerting sufficient force at lower mount packing densities to resist the thermal and vibrational conditions intrinsic in the operation of catalytic converters.

DETAILED DESCRIPTION OF THE INVENTION

Sheet materials containing low density inorganic filler components may be formed by papermaking techniques as will be described more fully hereinbelow. The low density inorganic filler components in the form of hollow glass microspheres (glass microbubbles), fly ash or expanded vermiculite are selected in a size range to accommodate the voids and the packing characteristics of the fiber matrix which retains the filler components within the sheet. The preferred size of low density filler components, for optimum retention within the fiber matrix, is 25 to 200 microns diameter at 10–40 weight percent loadings. Other inorganic fillers whose shape and size allow a significant increase in the bulk volume and, therefore, a significant decrease in the bulk density of an intumescent sheet include mica platelets and diatomaceous earth.

The sheet material can be produced to desired thicknesses from about 0.5 to about 10 mm.

Suitable binders can include various polymers and elastomers in latex form, as for example, natural rubber latices, styrene-butadiene latices, butadiene-acrylonitrile latices, latices of acrylate and methacrylate polymers and copolymers and the like. Suitable inorganic binders may include tetrasilicic fluorine mica in either the water-swelling unexchanged form or after flocculation as the exchanged salt with a di- or polyvalent cation as well as bentonite or fibrous materials such as asbestos. Organic and inorganic binders may be used in combination to produce sheet materials according to the present invention.

The flexible intumescent sheet material is utilized in automobile exhaust catalytic converters as a mounting material by expansion in situ. The expanded sheet then holds the ceramic core or catalyst support in place in the container or canister. The thermal stability and resilience of the sheet after exfoliation compensate for the difference in thermal expansion of the metal canister and the ceramic substrate, for vibration transmitted to the fragile device and for irregularities in the metallic or ceramic surfaces.

The sheet material may be formed by standard papermaking techniques, either on a handsheet former or on Fourdrinier or Rotoformer type paper machines, taking suitable precautions to attain substantially uniform distribution of particles throughout the web. From 10 to 55% by weight of intumescent material, unexpanded treated flakes of vermiculite ore in particle sizes of from about 0.1 up to about 6 mm. and preferably up to about 2 mm., are combined in a large volume of water with solids in the proportions 10 to 50% inorganic fibrous materials, such as chrysotile or amphibole asbestos, soft glass fibers such as available under the tradename chopped E. glass, refractory filaments including zirconia-silica fibers, crystalline alumina whiskers and alumina-silicate fibers (available commercially under the tradenames Fiberfrax, Cerafiber and Kaowool), 10 to 40% inorganic low density filler components such as hollow glass microspheres (B23/500 3M Glass Bubbles), fly ash or expanded vermiculite (#5 Grade from W. R. Grace Co.) and 3 to 30% of binder as described above.

Flocculation is conveniently achieved using electrolytes such as alum, alkali or acid. Small amounts of organic fibrous materials may be added to impart additional green strength to the green sheet material. The intumescent material, inorganic fibrous material, low density inorganic filler component and organic latex binder are blended together in a large volume of water, of the order of 5 to 100 times as much by weight and the flocculating agent or agents are added. A small amount of surfactant or foaming agent may also be employed in order to improve the dispersion of the intumescent material without going beyond the scope of the invention. In order to avoid the use of asbestos in making the sheet, because of possible health hazards associated with this material, substitution of glass fiber materials or refractory (glass or cyrstalline) filaments or whiskers is possible without impairing the quality of the sheet. In general, asbestos fibers are less expensive than other fibers.

Sheet formation and tests relating to ring off cracking are illustrated in the following examples. In all cases, vermiculite ore refers to unexpanded vermiculite.

EXAMPLE 1

2000 ml water is placed into a Waring blender with 15.0 gms of alumina-silicate fibers (J-M Cerafibers) and mixed for 15 seconds. The fiber slurry is transferred to a 4 liter beaker and mixed with an air propelled blade. 8.0 gms of B. F. Goodrich Hycar 1562 X103 latex binder, and 29.8 gms of #4 Grade vermiculite ore (W. R. Grace Co.) are added to the fiber slurry. While mixing, 8 ml of dilute papermakers alum (25% solution of aluminum sulfate) is added to the slurry to precipitate the latex binder onto and/or dispersed throughout the other components. The mixture is agitated vigorously and then quickly poured onto a handsheet screen and allowed to set momentarily so as to minimize the pouring turbulence before tripping the drain to dewater. Drain time is about 5 seconds. The top sheet surface is blotted, the formed sheet is removed and sandwiched between additional blotters for pressing at 0.003 N/mm$^2$. The wet sheet is further dried on a conventional Williams Apparatus Co. sheet drier. The resulting intumescent sheet composite is exemplary of the state-of-the-art intumescent sheet materials described in U.S. Pat. Nos. 3,916,057 and 4,305,992.

Several additional handsheet composites were made using the above procedure and incorporating low density inorganic filler components such as glass microbubbles (B23/500 3M Glass Bubbles) and expanded vermiculite (#5 Grade from W. R. Grace Co.) in the amounts shown below.

| Example 1, Run | 1 | 2 | 3 | 4 | 5 | 6 | 7 | 8 | 9 | 10 |
|---|---|---|---|---|---|---|---|---|---|---|
| Hycar 1562 ×103 (wt. %) | 6.8 | 6.8 | 6.8 | 6.8 | 6.8 | 8.2 | 9.4 | 10.6 | 9.1 | 8.0 |
| Johns-Manville Cerafibers (wt. %) | 31.2 | 31.2 | 31.2 | 31.2 | 31.2 | 37.7 | 43.0 | 48.3 | 41.2 | 36.7 |
| Vermiculite Ore (wt. %) | 62.0 | 52.0 | 42.0 | 52.0 | 42.0 | 30.0 | 20.0 | 10.0 | 10.0 | 20.0 |
| B23/500 3M Glass Bubbles (wt. %) | — | 10.0 | 20.0 | — | — | — | — | — | — | — |
| Expanded Vermiculite (wt. %) | — | — | — | 10.0 | 20.0 | 24.1 | 27.6 | 31.1 | 39.7 | 35.3 |
| Weight/Area (Kg/m$^2$) | 1.059 | 1.550 | 1.550 | 1.528 | 1.515 | 1.531 | 1.576 | .809 | .794 | .814 |
| Caliper (mm) | 1.74 | 3.40 | 4.61 | 3.82 | 4.63 | 5.43 | 6.18 | 3.24 | 3.48 | 3.20 |
| Density (gm/cc) | .609 | .454 | .336 | .400 | .327 | .282 | .255 | .255 | .228 | .253 |

EXAMPLE 2

Alumina-silicate fibers (J-M Cerafibers) were slushed at 1.5% solids in a 2500 gallon Morden Slush-Maker for 4.0 minutes. The fiber slurry was pumped to a 3000 gallon stock chest in which 135 lbs. Hycar 1562 X103 latex (41% solids) was added. The latex was precipated with papermakers alum to a pH of 4.9. 80 lbs. of B23/500 3M Glass Bubbles (80 microns average diameter) were added to the latex-fiber slurry and then metered to the wet end at controlled flow rates. #4 Grade vermiculite ore (W. R. Grace Co.) was then metered and mixed into the latex-fiber-microbubble slurry at a rate to provide a dry sheet composition as described in Example 1, Run 2. The latex-fiber-microbubble-vermiculite ore slurry was then pumped to the headbox of a Rotoformer paper machine to form and dewater a composite sheet 52 inches wide. The dewatered sheet was then wet pressed at 0.06 N, dried, and wound up into jumbo rolls at the dry end of the paper machine. The machine speed was changed three times to produce three different basis weight low density mat materials. Sheet properties were as follows:

| Example 2, Run | 1 | 2 | 3 |
|---|---|---|---|
| Average weight/area (Kg/m$^2$) | 1.10 | 1.37 | 1.63 |
| Average thickness (mm) | 2.3 | 2.6 | 3.2 |
| Average bulk density (gm/cc) | .478 | .525 | .508 |

The procedures used to make the low density intumescent sheet materials above, were repeated, but this time microbubbles were not used. This was to produce the state-of-the-art intumescent sheet material (composition as per Example 4, U.S. Pat. No. 4,305,992) on the same paper machine under the same process conditions at two different basis weights. The following sheet properties were obtained:

| Example 2, Run | 4 | 5 |
|---|---|---|
| Average weight/area (Kg/m$^2$) | 1.45 | 1.00 |
| Average thickness (mm) | 2.3 | 1.6 |
| Average bulk density (gm/cc) | .630 | .625 |

These examples show that a significant reduction in mat bulk density can be achieved by incorporating low density filler components and that such low density sheet materials can be produced on a Rotoformer paper machine.

EXAMPLE 3

One-hundred twenty pounds of alumina-silicate fibers (J-M Cerafibers) were slushed in 1000 gallons of water in a Morden Slush-Maker for eight minutes. This slurry was pumped to a 2000 gallon stock chest and diluted with an additional 530 gallons of water. Twenty-six pounds of Rhoplex HA-8 (Rohm & Haas Co.) latex and 80 pounds of #5 Grade expanded vermiculite (W. R. Grace Co.) was added to the fiber slurry. Dilute alum was then added while mixing to reduce the slurry pH to 4.9 and to precipitate the latex. This latex-fiber-expanded vermiculite slurry was pumped to a mixing vat at controlled flow rates. 190 4 Grade vermiculite ore (W. R. Grace Co.) was then metered and mixed with the slurry to provide a solids composition as stated in Example 1, Run 6. The slurry was then flowed onto a Fourdrinier wire to form and dewater a composite sheet 18 inches wide. The dewatered sheet was then wet presed at about 0.06N, dried, and wound up into rolls at the dry end of the paper machine. The machine speed was changed five times to produce five different basis weight low density mat materials with the following sheet properties:

| Example 3, Run | 1 | 2 | 3 | 4 | 5 |
| --- | --- | --- | --- | --- | --- |
| Average weight/area (Kg/m$^2$) | 1.357 | 1.292 | 1.203 | 1.087 | 0.970 |
| Average thickness (mm) | 3.25 | 3.05 | 2.88 | 2.94 | 2.40 |
| Average bulk density (gm/cc) | .418 | .424 | .417 | .370 | .405 |

Again, the above procedure was repeated but without the low density filler, i.e., expanded vermiculite. The resulting state-of-the-art intumescent sheet (Example 1, Run 1 composition) had an average bulk density of 0.62 gm/cc.

EXAMPLE 4

In designing intumescent sheet materials for holding ceramic catalyst cores (especially diesel particulate filters) in metal housings of catalytic converters, it is important to consider the forces which are exerted on the monolith and the changes in these forces due to the thermal expansion differences of the ceramic core and the metal housing. A test was devised to measure the forces exerted by various mounting systems. The test consists of mounting cylindrical ceramic cores (152.4 mm long×118 mm diameter) inside a metal canister (123.4 mm I.D.) and recording the maximum force required to move the core relative to the canister. This test is performed on an MTS tensile tester (MTS Systems Corp.) and is termed the "push out" test. The maximum "push out" force is recorded in Newtons. Push out test conditions are used to simulate the operating temperature ranges of the catalytic converter:

A. "Green" push out force. This is the force required to move the ceramic core and is a function of the force exerted on the ceramic core by the intumescent sheet just after mounting of the converter assembly and measures the "looseness" or "tightness" of the core before heating or intumescence of the sheet material. A "loose" mount is unacceptable since damage to the ceramic core can easily occur in the normal handling and initial operation of the catalytic converter.

B. "Hot" push out force. This is the force required to move the ceramic core after the converter assembly is heated to 600° C.

The following table shows the relative push out forces at various mount densities of intumescent sheet compositions from Example 1.

| Example 1, Run No. | Low Density Filler Component | Converter Mount Density (gm/cc) | Push Out Force (Newtons) Green | Push Out Force (Newtons) Hot |
| --- | --- | --- | --- | --- |
| 1 | None | .404 | "Loose" | 1175 |
| 1 | None | .485 | "Loose" | 4950 |
| 1 | None | .656 | 10 | 10600 |
| 2 | 10% Bubbles | .486 | 50 | 3550 |
| 3 | 20% Bubbles | .495 | 175 | 7000 |
| 4 | 10% Exp. Verm. | .478 | 25 | 4600 |
| 5 | 20% Exp. Verm. | .478 | 75 | 5675 |
| 6 | 24.1% Exp. Verm. | .317 | 10 | 1121 |
| 6 | 24.1% Exp. Verm. | .402 | 10 | 1700 |
| 6 | 24.1% Exp. Verm. | .468 | 175 | 6325 |
| 7 | 27.6% Exp. Verm. | .324 | 25 | 1975 |
| 7 | 27.6% Exp. Verm. | .500 | 250 | 7725 |
| 8 | 31% Exp. Verm. | .311 | 500 | 825 |
| 9 | 39.7% Exp. Verm. | .306 | 750 | 1750 |
| 10 | 35.3% Exp. Verm. | .314 | 600 | 1785 |

EXAMPLE 5

A hot vibration and water quenching test of converter mounting systems is used by automotive companies to simulate 50,000 miles of actual use on automobiles. This test consists of wrapping an oval substrate (8.3 cm long×12.0 cm wide×8.0 cm high) with test intumescent mounting material and placing the wrapped substrate between two metal clamshell type canister halves in which the mounting gaps were premeasured to be between 3.75 to 5.20 mm. The canister halves are pressed together and welded to complete the converter assembly. The converter assembly is connected to the exhaust of an eight cylinder engine for 30 minutes with the exhaust temperature controlled at 600° C. The hot converter is quenched with water for 30 seconds and reheated for 30 minutes. The quenching and heat cycles are repeated 20 times. After the water quench test, the converter is mounted in an Unholtz-Dickey vibrator and again connected to the eight cylinder engine exhaust controlled at 600° C. to 950° C. (the lower test temperatures can be used to simulate conditions of underbody converters while the higher test temperatures simulate converters mounted closer to the exhaust manifold). The test converter is then vibrated at 35 G's at 100 Hz for 30 hours. Failure of the mounting material results in movement and/or destruction of the ceramic substrate within the canister before completion of the water quenching cycles and/or vibration times stated. Survival of the system is representative of at least 50,000 miles of actual automobile use.

It is recognized that the mount density of mounting materials within converter assemblies is a function of the mounting gap in conjunction with the mass (weight/area) of the mounting sheet materials used. It has been shown that the holding forces of the mats vary (Example 4) with mount density, and that failure of the system can occur if the mount density is too low. The following water quench/hot vibration tests were run to establish the lower mount density limits of both standard and low density intumescent sheet materials.

| Vibration Test No. | Example 1, Run No. | Low Density Filler | Converter Mounting Density (gm/cc) | Test Temp. (°C.) | Vibration Test Results | Push-Out Force (N) Green | Push-Out Force (N) @ 600° C. |
|---|---|---|---|---|---|---|---|
| 1 | 1 | None | .657 | 875 | 30 hr pass | 10 | 10600 |
| 2 | 1 | None | .478 | 875 | 30 hr pass | "Loose" | 4950 |
| 3 | 1 | None | .404 | 875 | 1 min fail | "Loose" | 1175 |
| 4 | 2 | 10% Bubbles | .600 | 610 | 30 hr pass | 300 | 8600 |
| 5 | 3 | 20% Bubbles | .410 | 875 | 1 min fail | 10 | 1800 |
| 6 | 6 | 24.1% Exp. Verm. | .404 | 875 | 30 hr pass | 10 | 1700 |
| 7 | 6 | 24.1% Exp. Verm. | .314 | 875 | 1 min fail | <10 | 1120 |

The above table shows that failures of the mounting sheet can be expected when the hot push out force on the ceramic monolith is about 1200 Newtons or less (test nos. 3 and 7). Survival of the system can be expected when the hot push out force is 1700 Newtons or greater (test nos. 1, 2, 4, and 6). The vibration tests of the low density microbubble intumescent sheet (test nos. 4 and 5) show failure at the 875° C. test temperature and survival at 610° C. This is due to the lower melting point of the glass microbubbles, i.e., about 610° C. It is obvious from these tests that the higher continuous use temperatures typical of the expanded vermiculite containing sheet is desired and required in most intumescent sheet converter mounting applications. It is possible however that the low density microbubble filled sheet could be used at lower temperatures such as found in catalytic converters located further from the engine.

The second test criteria for acceptable intumescent sheet materials is found in the above table under "Green" push-out force. For example, in test no. 2, the state-of-the-art intumescent sheet mounted at 0.478 gm/cc density exerts more than adequate holding force to pass the vibration test but the "loose" mount in the green state is unacceptable due to potential damage to the ceramic core inside the metal housing during the handling and assembly operations in manufacturing automobiles. It has been found that unacceptable "loose" mounts will occur below about 0.6 gm/cc green mount density with the state-of-the-art intumescent sheet materials. The low density intumescent sheets of the present invention, when formulated properly, can provide the "tightness" of fit at a much lower green mount density of 0.4 gm/cc. This reduction in mount density, of at least 33%, still provides the hot holding forces necessary to survive the vibrations inherent in the operation of automobiles.

EXAMPLE 6

A test was devised to determine the maximum mount density of standard and low density intumsecent sheet materials that could be used in mounting diesel particulate filters without encountering ring off cracking. Diesel particulate filters (116.8 mm diameter×152.4 mm long, 100 cells/in.² monoliths from Corning Glass Works) were mounted into cylindrical canisters having a mounting gap of about 3.0 mm. The test units were assembled at various mount densities using sheet materials from Example 1 and connected to an exhaust gas simulator (made by RPS Engineering Co.) and heated to 950° C. for ten minutes. The test unit was cooled, disassembled, and inspected for ring off cracking.

| Example 1, Run No. | Low Density Filler Component | Converter Mount Density (gm/cc) | Ring-Off-Crack |
|---|---|---|---|
| 1 | None | .667 | No |
| 1 | None | .705 | yes |
| 2 | 10% Bubbles | .608 | No |
| 6 | 24.1% Exp. Verm. | .681 | No |
| 6 | 24.1% Exp. Verm. | .708 | Yes |

Under these test conditions, ring off cracking of the diesel particulate filters occurs at converter mount densities of 0.7 gm/cc and higher; below 0.68 gm/cc mount densities, ring off cracking will not occur with either the state-of-the-art or the low density intumescent sheet materials. The following table illustrates the workable converter mounting density ranges for both the state-of-the-art and low density intumescent sheet materials for mounting diesel particulate filters.

| Intumescent Sheet Material | Converter Mount Density Limits | |
|---|---|---|
| | Lower (gm/cc) | Upper (gm/cc) |
| State-of-the-art | 0.60 | 0.68 |
| Example 1, Run No. 6 | 0.40 | 0.68 |

The workable mount density range for the prior art intumescent sheet is 0.64±0.04 gm/cc or ±6.3%. The workable range for the Example 1, Run No. 6 low density intumescent sheet is 0.54±0.14 gm/cc or ±25.9%. Thus, the low density intumescent sheets of the present invention provide a workable converter mount density range about four times greater than the range provided by currently available state-of-the-art intumescent sheets.

We claim:
1. A low density flexible intumescent sheet useful for mounting diesel particulate filter monoliths comprising from about 10% to about 55% by weight of unexpanded vermiculite flakes having particle sizes of from about 0.1 mm to about 6 mm, from about 10% to about 50% by weight of inorganic fibrous material, from about 3% to about 30% by weight of binder and from about 10% to about 40% by weight of inorganic low density filler component, said sheet, having an average bulk density of from about 0.25 gm/cc to about 0.525 gm/cc, when packed about a ceramic catalytic converter core within a metal canister at a mount density of from about 0.40 gm/cc to about 0.68 gm/cc having a green push out force (as herein defined) against said core of at least 10 Newtons, said sheet upon exposure to heat from an engine exhaust being capable of undergoing thermal expansion to such an extent that said sheet in its ex- panded state has a hot push out force (as herein defined) against said core of at least 1700 Newtons.

2. A low density flexible intumescent sheet according to claim 1 of a thickness of 0.5 mm. to 10 mm.

3. A low density flexible intumescent sheet according to claim 1 containing about 10% to about 25% inorganic low density filler component.

4. A low density flexible intumescent sheet according to claim 3 wherein the inorganic low density filler is hollow glass microspheres or expanded vermiculite.

5. A low density flexible intumescent sheet according to claim 1 containing 30% by weight of unexpanded vermiculite flakes, 37.7% by weight of alumina-silicate fiber, 8.2% by weight of latex binder and 24.1% by weight of expanded vermiculite.

* * * * *

UNITED STATES PATENT AND TRADEMARK OFFICE
CERTIFICATE OF CORRECTION

PATENT NO. : 4,385,135
DATED : May 24, 1983
INVENTOR(S) : Roger L. Langer and Alan J. Marlor It is certified that error appears in the above—identified patent and that said Letters Patent is hereby corrected as shown below:

Column 5, line 15, change "190 4" to "#4".

Signed and Sealed this

Twenty-third Day of August 1983

[SEAL]

Attest:

GERALD J. MOSSINGHOFF

Attesting Officer

Commissioner of Patents and Trademarks